United States Patent [19]
Allebach et al.

[11] Patent Number: 5,661,824
[45] Date of Patent: Aug. 26, 1997

[54] MAGNIFYING DIGITAL IMAGE USING MAPPING

[76] Inventors: Jan P. Allebach, 1721 Woodland Ave., West Lafayette, Ind. 47906; Ping Wah Wong, 1443 Knowlton Dr., Sunnyvale, Calif. 94087

[21] Appl. No.: 412,640

[22] Filed: Mar. 29, 1995

Related U.S. Application Data

[63] Continuation of Ser. No. 227,764, Apr. 14, 1994, Pat. No. 5,446,804.

[51] Int. Cl.$^6$ .................... G06K 9/42; G06K 9/32; H04N 1/46; G06F 15/00
[52] U.S. Cl. ............... 382/298; 395/128; 348/581; 358/528; 382/293
[58] Field of Search .................... 382/298, 293, 382/299; 395/128; 348/581; 358/528

[56] References Cited

U.S. PATENT DOCUMENTS

| | | | |
|---|---|---|---|
| 4,611,349 | 9/1986 | Hou | 382/298 |
| 4,975,976 | 12/1990 | Kimata et al. | 382/293 |
| 4,979,229 | 12/1990 | Moolenaar | 382/299 |
| 5,054,100 | 10/1991 | Tai | 382/300 |
| 5,131,057 | 7/1992 | Walowit et al. | 382/41 |
| 5,142,592 | 8/1992 | Moler | 382/203 |
| 5,305,398 | 4/1994 | Klein et al. | 382/298 |
| 5,446,804 | 8/1995 | Allebach et al. | 382/298 |

FOREIGN PATENT DOCUMENTS

| | | | |
|---|---|---|---|
| 645736A2 | 3/1995 | Japan | G06T 3/40 |

OTHER PUBLICATIONS

G. H. Atwood, et al., "Third International Conference on Image Processing and Its Applications", Jul. 18–20, pp. 664–668.

Ernst E. Triendl, "How to get the Edge into the map", Proceedings of the 4th International Joint Conference on Patter Recognition, Kyoto, Japan, Nov. 7–10, 1978, pp. 946–950.

Rosenfeld, Azriel and Kak, Avinash, K., "Digital Picture Processing", 1982, Academic Press, Orlando Florida, pp. 85–97.

*Primary Examiner*—Leo Boudreau
*Assistant Examiner*—Monica S. Davis

[57] ABSTRACT

A method of magnifying a digital image based on an edge map. The image has many original pixels, with each pixel having a level, and the locations of the pixels having a resolution. The method to magnify the image includes the steps of producing an edge map with many boundaries from the digital image, projecting the edge map onto the digital image, generating one or more additional pixels in locations among the original pixels by manipulating the levels of one or more original pixels without crossing any boundaries set by the edge map, and expanding the distances between the pixels so that the resolution of the locations of the pixels becomes the same as the original pixels. In another preferred embodiment, the original digital image is enlarged to the size of the magnified image by extending proportionally the locations of the original pixels. Then the edge map is produced and projected onto the enlarged image to generate additional pixels. After the step of generating, the resolution of the locations of the pixels becomes the same as the original pixels.

11 Claims, 18 Drawing Sheets

MAGNIFYING DIGITAL IMAGE USING MAPPING

CROSS REFERENCE TO RELATED APPLICATION(S)

This is a continuation of application Ser. No. 08/227,764 filed on Apr. 14, 1994, now U.S. Pat. No. 5,446,804.

BACKGROUND OF THE INVENTION

The present invention relates generally to magnifying a digital image and more particularly to magnifying a digital image using an edge map.

The proliferation of digital imagery cries for better ways to magnify an image. In a traditional magnification process, additional pixels are added into the original pixels. Then the size of the image is magnified so that the distance between adjacent pixels is maintained to be the same as that in the original digital image.

Different methods are available to add the additional pixels. One method simply replicates pixel—adds a number of pixels surrounding every existing pixel to form a block of pixels with the same level. FIG. 1 shows an image before magnification and FIG. 2 shows the image after magnification by such a method. Observe the small square blocks of unpleasant pixels are about 0.5 mm wide making up the image, and the jagged edges, such as the edges of the petals of the flowers.

Another method generates the additional pixels by interpolating the levels of adjacent original pixels. FIG. 3 shows a magnified image formed by such a bilinear-interpolation method. This method substantially removes the blocks of unpleasant pixels and the jagged edges. However, the crisp edges in the original image are blurred due to the averaging effect.

It should be apparent from the foregoing that there is still a need for a method to magnify a digital image that maintains its crisp edges.

SUMMARY OF THE INVENTION

The present invention provides methods to magnify a digital image that substantially maintains its crisp edges. Prior arts tend to generate small blocks of unpleasant pixels with jagged edges or blur the crisp edges of the original digital image.

The digital image has many original pixels. Each pixel has a level, and the locations of the pixels have a resolution. In one preferred embodiment of the present invention, an edge map is produced from the digital image. The map with its many boundaries are projected onto the digital image to help generate the levels of one or more additional pixels in locations among the original pixels. In the process to generate additional pixels, the levels of one or more original pixels are manipulated without crossing any boundaries set by the edge map. After the additional pixels are generated, the distances between all the pixels are expanded so that the resolution of the locations of the pixels becomes the same as the original pixels. Thus, the digital image is magnified.

In another preferred embodiment, the original image is enlarged, before producing the edge map, to the size of the magnified image by expanding proportionally the distances separating the original pixels. Then the edge map is produced and projected onto the enlarged image to generate additional pixels. After the step of generating, the resolution of the locations of the pixels becomes the same as the original pixels.

With the edge map, the magnified image is substantially as crisp as the original image.

Other aspects and advantages of the present invention will become apparent from the following detailed description, which, when taken in conjunction with the accompanying drawings, illustrates by way of example the principles of the invention.

Same numerals in FIGS. 1–18 are assigned to similar elements in all the figures. Embodiments of the invention are discussed below with reference to FIGS. 1–18. However, those skilled in the art will readily appreciate that the detailed description given herein with respect to these figure is for explanatory purposes as the invention extends beyond these limited embodiments.

DETAILED DESCRIPTION OF THE INVENTION

Figure 1:
FIG. 1 shows an image before magnification.
Figure 2:
FIG. 2 shows the image magnified by a prior arts pixel-replication technique.
Figure 3:
FIG. 3 shows the image magnified by a prior arts bilinear-interpolation technique.
Figure 4:
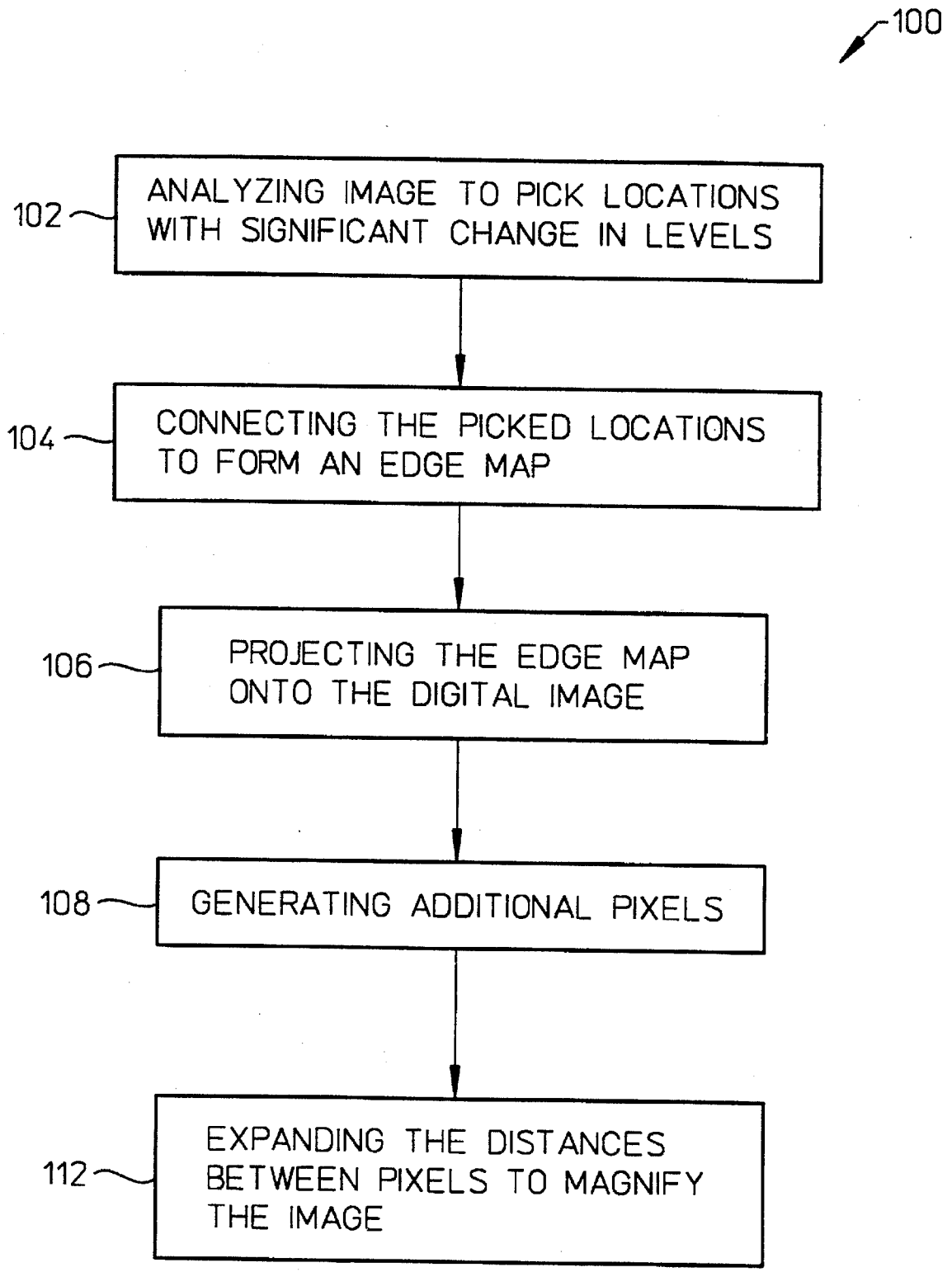
FIG. 4 shows one preferred method to magnify a digital image in the present invention.

FIG. 4 shows one preferred method 100 to magnify a digital image with many original pixels. The pixels are arranged with a certain resolution, for example, 300 dots or pixels per inch. Each pixel has a level, which describes the intensity at that pixel. For a continuous tone image, the intensity level may vary from 0 to 255. For a non-continuous tone image, such as a halftone image, preferably, it is transformed to a continuous tone image before it is magnified; this process will be further described later in the detailed description.

In the image, any region with a crisp-edge is a region with a significant change in level. The first step in the preferred embodiment 100 is to analyze, 102, the image to pick all the locations with significant change in levels. This can be done visually or analytically.

One can visually identify all the regions with sharp changes in intensity. However, this can be a tedious task.

Figure 5:
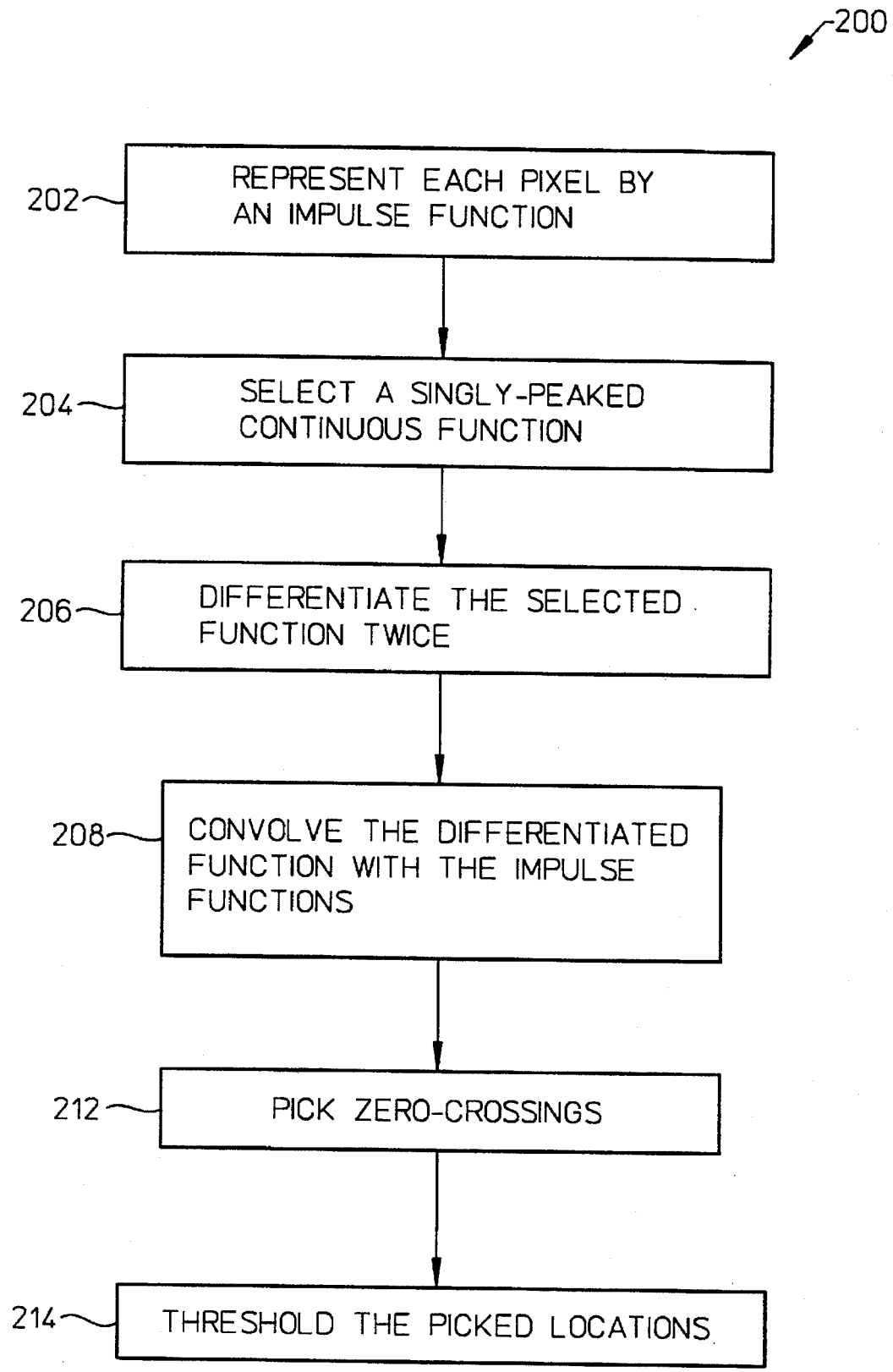
FIG. 5 shows one preferred method to pick locations with significant changes in levels.

FIG. 5 shows one preferred analytical method, 200, to pick locations with significant changes in levels. Each pixel is represented, 202, by an impulse function with its magnitude being the level at that pixel. Then select, 204, a singly-peaked continuous function. As an example, this can be a normalized Gaussian function, having a second standard deviation covering the width of 3 original pixels. With the image being two-dimensional, the selected function is a two-dimensional surface. The selected continuous function is differentiated, 206, twice. If the function is a Gaussian function then the second derivative is known as the Laplacian of the Gaussian. The result from the differentiation step is convolved, 208, with all the impulse functions, and the outputs are superimposed spatially to generate a convolved result. Pick, 212 all the locations that have substantially zero values from the convolved result. All the crisp-edge locations in the image before magnification correspond to locations in the convolved results with substantially zero values.

Figure 6:
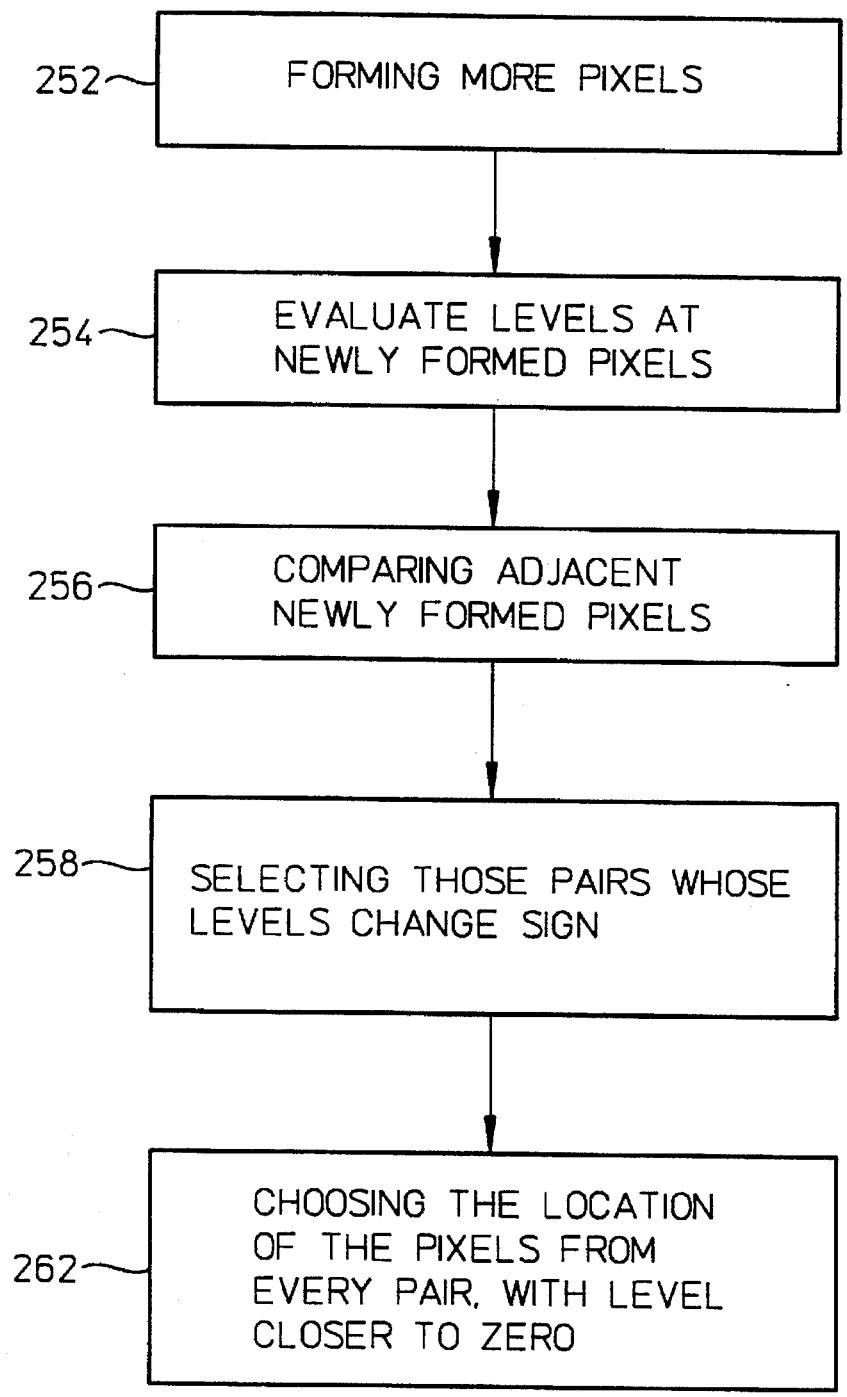
FIG. 6 shows one preferred method to pick locations of zero-crossings.

FIG. 6 shows one preferred method, 250, to pick locations that have substantially zero values or to pick the "zero-crossings" from the convolved results. There are a few ways to select the "zero-crossings." One can solve analytically the convolved result to find all the locations having zeros. This calculation might be quite cumbersome. Another preferred way is to solve the convolved result at selected positions, as shown in FIG. 6, in combination with FIG. 7.

Figure 7:
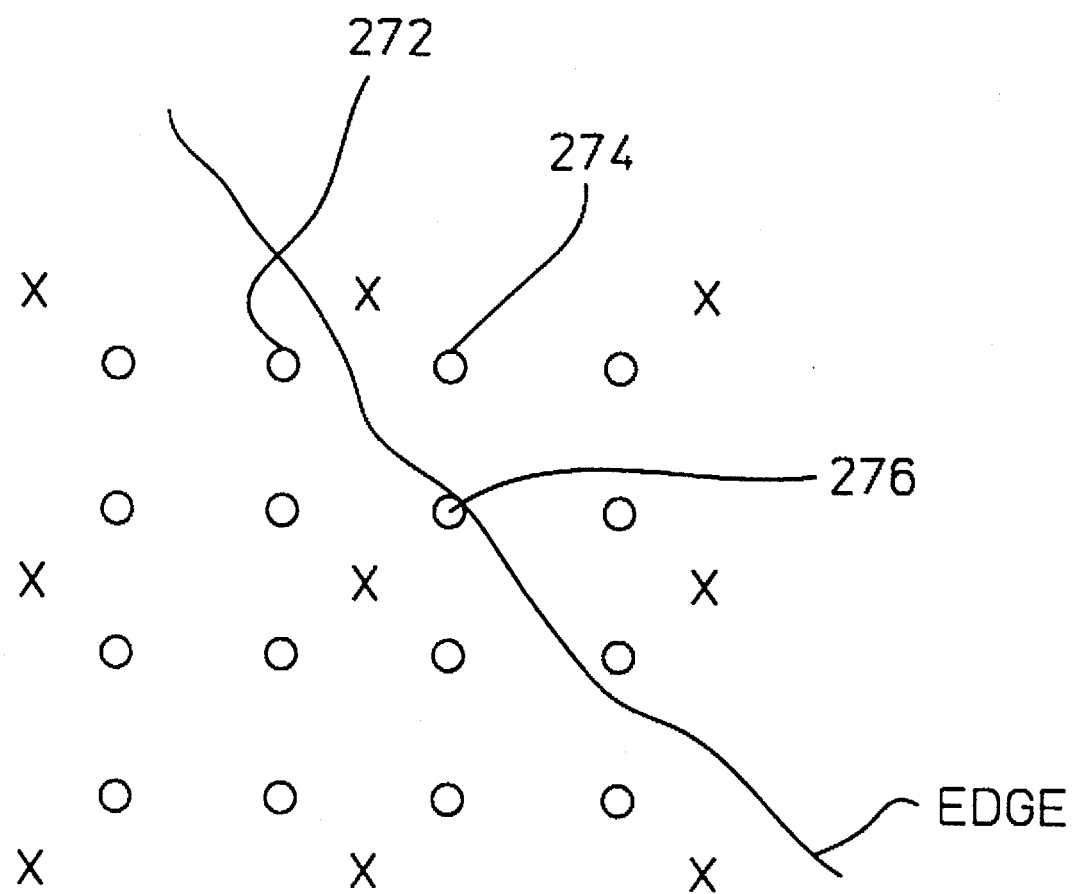
FIG. 7 shows a boundary with original pixels and temporary pixels for the present invention.
Figure 7:
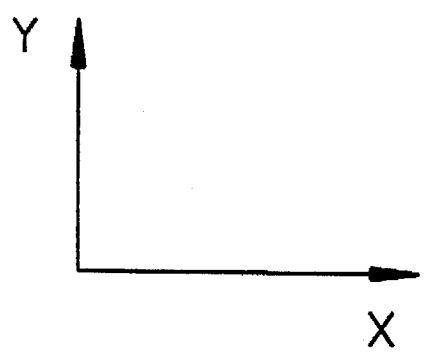

Assume that one wants to magnify the image N times, and the minimum distance between adjacent original pixels is D. In the present example shown in FIG. 7, N is 2, and D is 3.3 mils for an image with a 300 dots/inch resolution. In picking, 250, locations with substantially zero value, first, one forms, 252, temporary pixels at positions offset from the original pixels, with the minimum distance between adjacent temporary pixels being D/N. In FIG. 7, the crosses represent the locations of the original pixels at 300 dots per inch; the circles represent the temporary pixels; and the line marked EDGE represents the theoretical locations with significant changes in levels. The minimum distance between adjacent circles in FIG. 7 is D/N or 1.67 mils, which gives a resolution of 600 dots per inch. The circles are offset from the crosses. The amount of offset is D/(2N) in both the X and the Y direction, with N being 2.

The convolved result is evaluated, 254, at the temporary pixels. The levels of adjacent temporary pixels are compared 256, to select, 258, those pairs of adjacent temporary pixels whose levels change sign. For example, there will be a sign change between the levels at circles 272 and 274, and between the levels at circles 274 and 276. Note that in the present application, changing sign includes changing from zero to either a positive or negative value.

From every selected pair, choose, 262, the location of one temporary pixel whose level is closer to zero. Refer back to FIG. 7, for the pair 274 and 276, the location of the temporary pixel 276 is selected.

Figure 8:
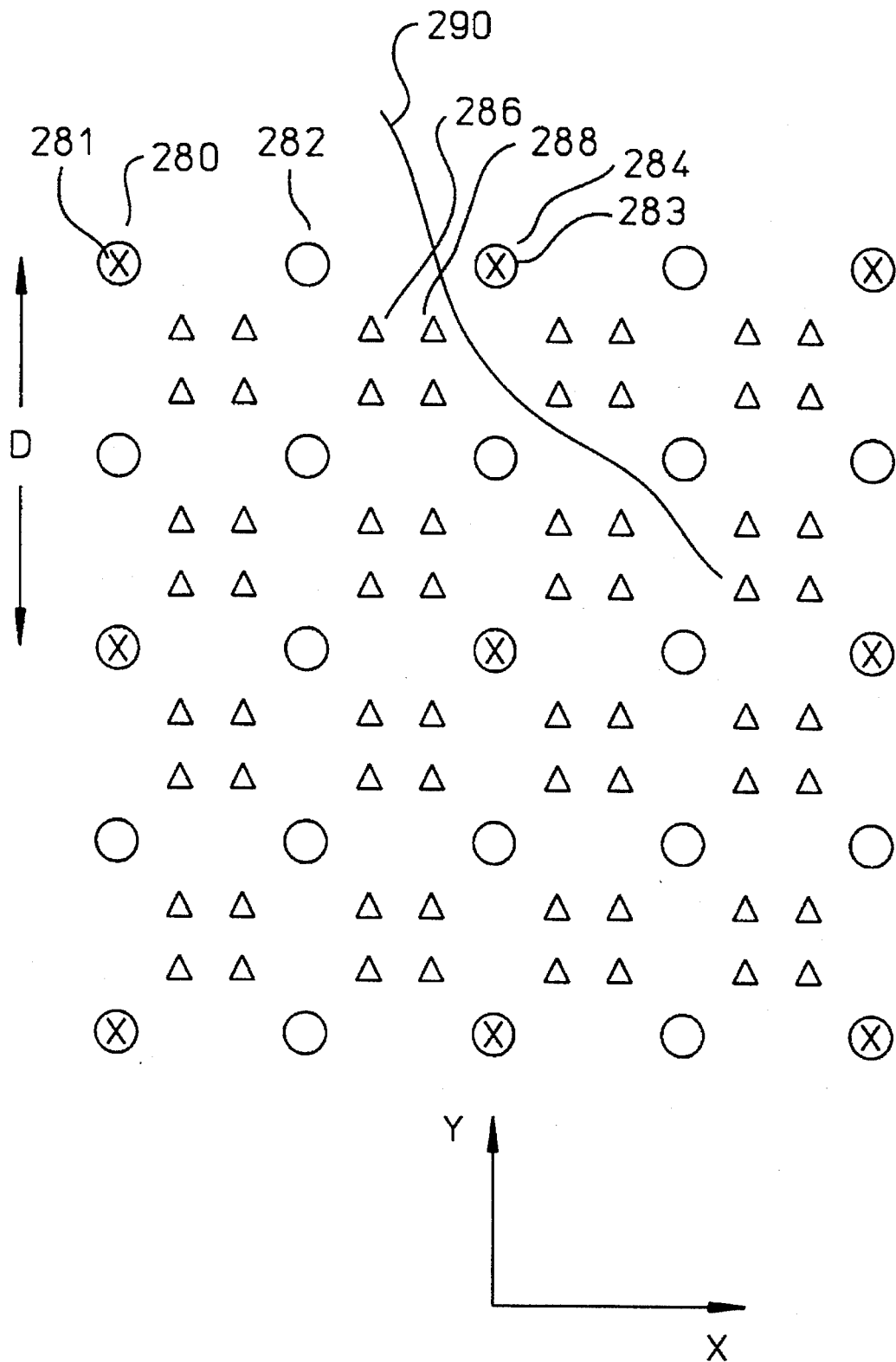
FIG. 8 shows a boundary with original pixels, temporary pixels and target pixels for the present invention.

The method 250 may be used in combination with FIG. 8 as another scheme to pick locations that have substantially zero values or to pick the "zero-crossings" from the convolved result. This scheme reduces the amount of computation required and is especially suitable for even number magnification higher than 2. First, one forms, 252, not just temporary pixels, whose positions are shown as circles, but also target pixels, whose positions are shown as triangles. The locations of the temporary pixels have a resolution doubling the original resolution, with some of them not displaced from the original pixels. The locations of the target pixels have a resolution four times the original resolution, and are displaced from the temporary pixels by D/(2N) in both the X and the Y direction, with N being 4 for the example shown in FIG. 8. The levels are again evaluated, 254, at the temporary pixels, with adjacent temporary pixels compared, 256, to select, 258, those pairs with sign change in their levels.

From every selected pair of temporary pixels, choose the location of an adjacent target pixel. One choosing process is as follows: for a selected pair of temporary pixels along the X-direction with a certain Y coordinate, consider the pair of the target pixels with a smaller Y coordinate; and for a selected pair along the Y-direction with a certain X coordinate, consider the pair of target pixels with a larger X coordinate. For the target pixels considered, choose the location of the target pixel that is closer to one of the temporary pixel; that temporary pixel has a level that is closer to zero than the other temporary pixel. If both temporary pixels have the same level, choose either one of the target pixels. This scheme reduces the amount of computation required as compared to the scheme described in FIG. 7.

As an example, in the vicinity of the original pixels 280 and 284 one forms the temporary pixels 281, 282 and 283, and the target pixels 286, 288. The signs of the levels of the temporary pixels 282 and 283 are different, with the level of 283 being closer to zero. With the target pixel 288 being physically closer to the temporary pixel 283, the target pixel 288 is chosen.

Figure 9:
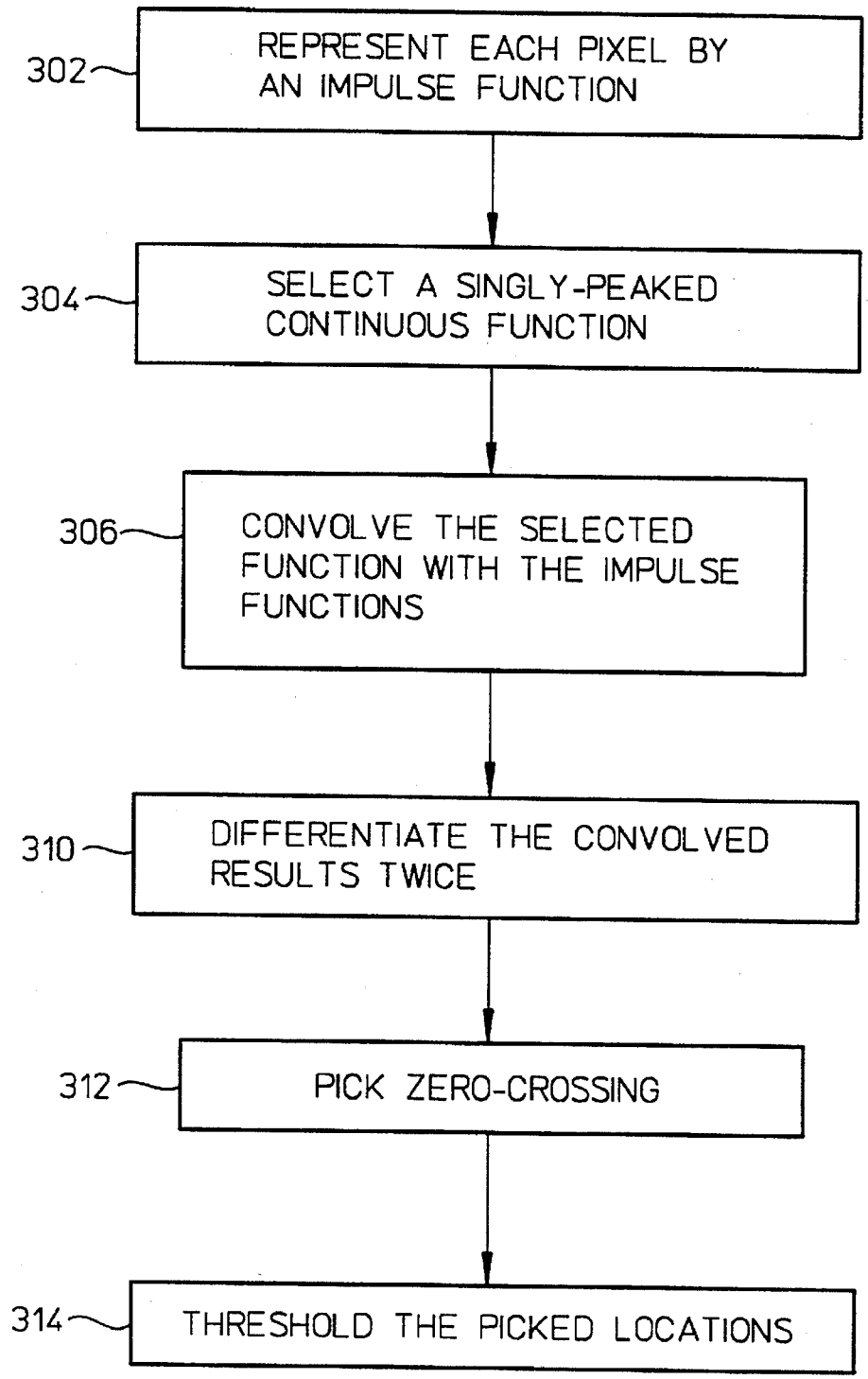
FIG. 9 shows another preferred method to pick locations with significant changes in levels.

FIG. 9 shows another preferred embodiment 300 to pick locations with significant changes in levels. Each pixel is again represented, 302, by an impulse function with its magnitude being the level at that pixel. Then again select, 304, a singly-peaked continuous function, such as the same Gaussian function picked in the previous embodiment The selected function is convolved, 306, with all the impulse functions, and the outputs are superimposed together to get a convolved result.

The convolved result is differentiated, 310, twice to get a differentiated result. After the differentiation step, pick, 312, all the locations that have substantially zero from the differentiated result. All the crisp-edge locations have values that are substantially zero.

Again lone can use the method in FIG. 6 in combination with FIG. 7 or FIG. 8 to pick locations that have substantially zero values or the "zero-crossings" from the differentiated result. The main difference is at the step 254. Instead of evaluating the convolved result, one evaluates the differentiated result.

Due to noise in any system, there might be locations giving substantially zero values by the convolution step in the embodiment 200 or the differentiation step in the embodiment 300 that are not crisp-edge regions. Thus, it is preferred to threshold, 214 or 314, the picked locations. Thresholding, 214 or 314, means removing some of the picked locations if the local level variances of the picked locations are less than a pre-selected value. One can calculate local variances by finding the slopes or changes of the levels in the picked locations. If the slope is less than a certain pre-selected value, the picked locations are dropped.

The pre-selected value should be small because it is acceptable to have more locations which are perceived to be zero-crossings. However, missing zero-crossings would not be preferable. In one example, the pre-selected value is 0.03.

Figure 10:
FIG. 10 shows an example of an edge map in the present invention.

Refer back to FIG. 4. After the locations with significant change in levels are picked, 102, the locations should be connected, 104, to form boundaries for an edge map. However not all the locations should be connected. In one preferred embodiment, one connects any two picked locations to form a boundary if the distance between the locations is less than or equal to 1.414 (or the square root of 2) times the minimum distance between two adjacent original pixels. For a digital image with 300 dots per inch, the minimum distance is 3.3 mils, and 1.414 times of 3.3 is equal to 4.7 mils. FIG. 10 shows an example of a two-dimensional edge map formed by the above described process on the original image shown in FIG. 1. That map is enlarged to the size of the desired magnified image.

After the edge map is formed, it is projected, 106, onto the digital image. Then one generates, 108, many additional pixels in locations among the original pixels by manipulating the original pixels without crossing any boundaries set by the edge map. The number of additional pixels formed depends on the magnification desired. If one wants M times magnification in one dimension and N times in another dimension, one needs to increase the number of pixels in the image to M times N, which means forming additional number of pixels in appropriate locations.

Two different examples would be used to illustrate the methods to generate additional pixels. Both of them depend on interpolating the levels of one or more original pixels.

FIGS. 11A–D illustrate the first example, which is especially suitable for even numbers of magnifications. Crosses represent the locations of original pixels, for example, 379 and 383. Triangles represent the locations of additional pixels, for example, 385. In calculating the level of the additional pixel 385, one interpolates the levels of the original pixels, 377, 379, 381; but one does not use the level of the original pixel 383 because that would imply crossing a boundary, EDGE 1, in the edge map.

Figure 11A:
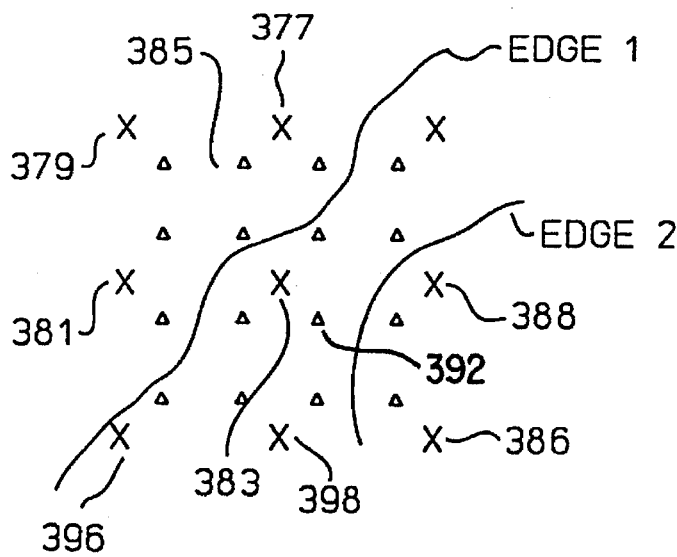
FIGS. 11A–E show two examples of interpolation methods in the present invention.
Figure 11B:
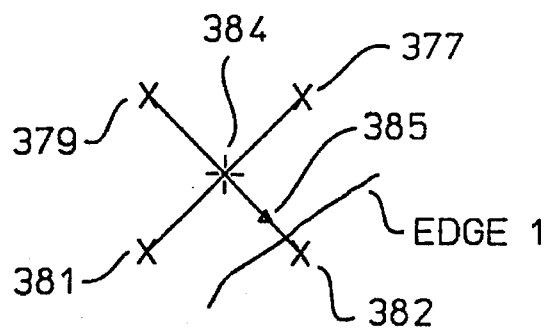
Figure 11C:
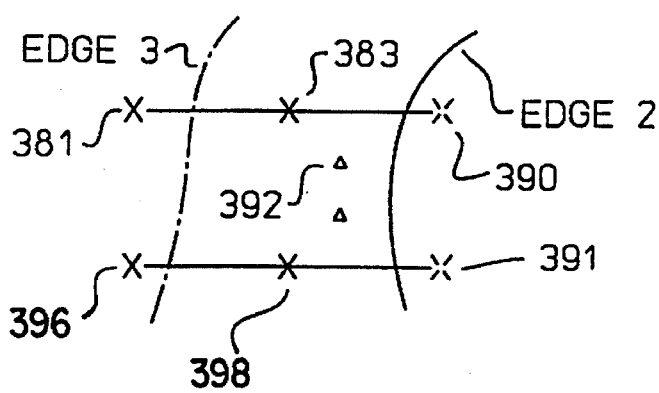
Figure 11D:

Numerous methods may be used to find the levels at the additional pixels. One method is to use bilinear interpolation, which is well known to those with ordinary skill in the art, and will not be further described. FIGS. 11B–D show a few preferred methods for finding the levels at the additional pixels using the edge map.

FIG. 11B–D shows an example of finding the level at additional pixel 385, based on the levels at three original pixels 377, 379 and 381. First, one finds the average level of the levels in 377 and 381. This will give the level of a fictitious pixel at 384. Then, based on the level at 384 and 379, one extrapolates to generate the level of another fictitious pixel 382. The fictitious pixel 382 is located at the location of the original pixel 383. From the levels of pixels 377, 379, 381 and 382, one calculates the level of the additional pixel 385 using bilinear interpolation. The above calculations use proportionality based on distance and will not be further discussed here.

FIG. 11C shows examples of finding the level at the additional pixel 392, based on two original pixels, 383, 398. Two situations will be described, the first situation involving just one boundary next to the original pixels, and the second situation involving the original pixels surrounded by two boundaries. In the first situation, with only EDGE2, but without EDGE3, one preferred method is to extrapolate based on the neighbors of the original pixels. The value at the fictitious pixel 390 is extrapolated from the levels in the original pixels 381 and 383, while the value at the fictitious pixel 391 is extrapolated from the levels in the original pixels 396 and 398. In the second situation, with both EDGE2 and EDGE3, one preferred method is to copy the value of the level in the original pixels 383 and 398 to the fictitious pixels 390 and 391 respectively. The locations of the fictitious pixels 390 and 391 are the locations of the original pixels 388 and 386 respectively. From the levels of pixels 383, 390, 398 and 391, one calculates the level of the additional pixel 392 using bilinear interpolation.

FIG. 11D shows an example of finding the level at the additional pixel 394, based on one original pixel, 381. One method is to duplicate the level of the original pixel, 381, at the locations of the fictitious pixels, 393, 395 and 397, which are the locations of the original pixels 383, 396 and 398 respectively. From the levels of the pixels 381, 393, 395 and 397, one calculates the level of the additional pixel 394 using bilinear interpolation.

Although the above calculations are based on bilinear interpolation, other interpolation techniques may be used, such as other higher order interpolation schemes.

Figure 11E:
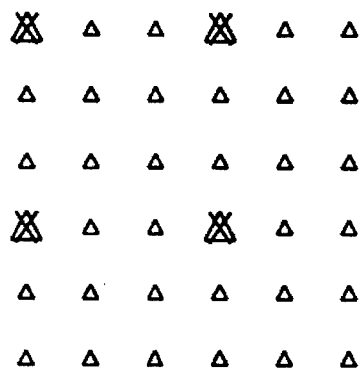
Figure 12B:
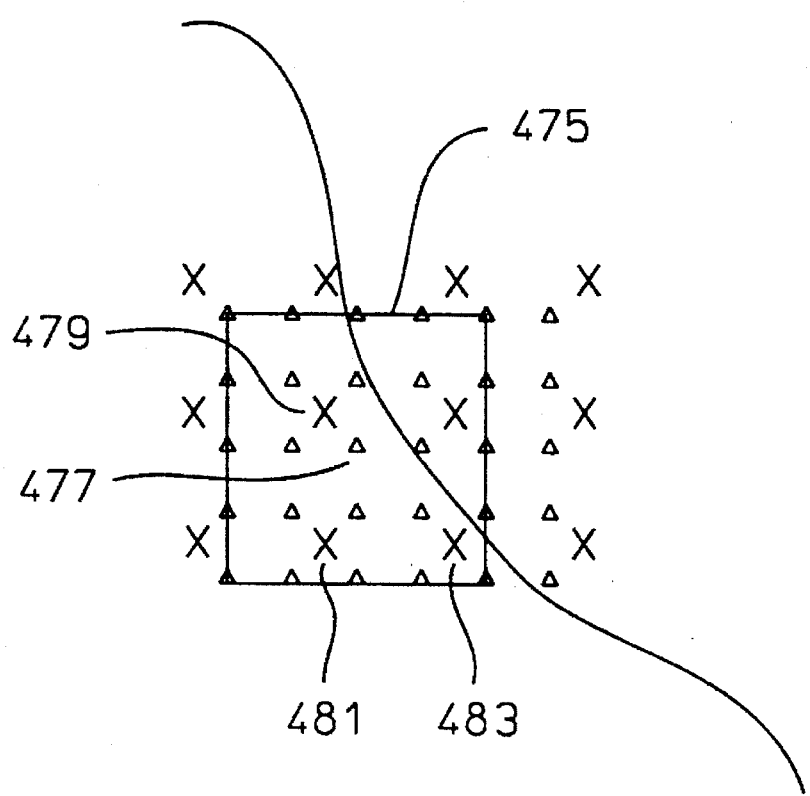
FIGS. 12A–B show a method to correct for abnormalities next to boundaries.
Figure 12A:
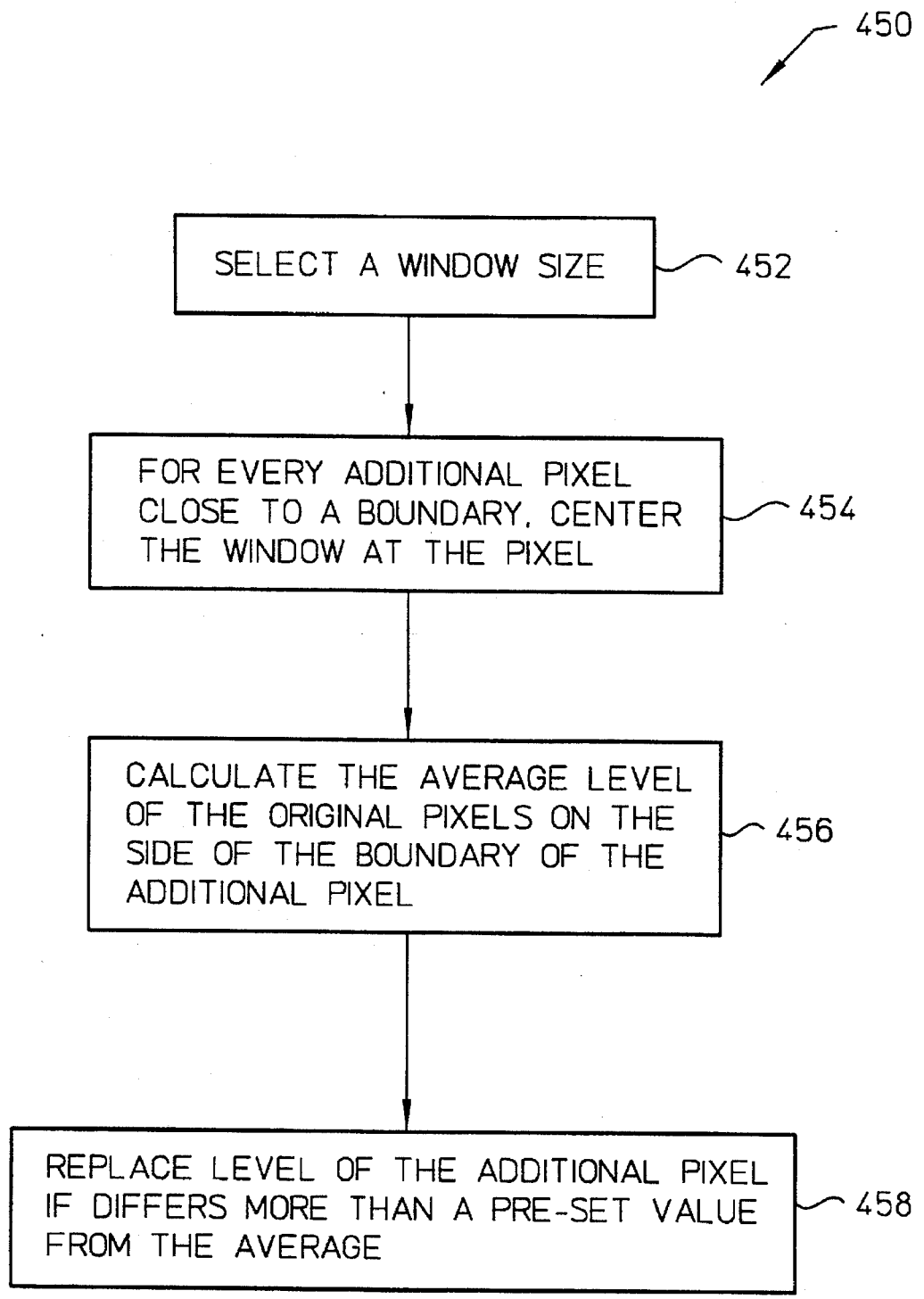

FIG. 11E illustrates the second example to find the levels at additional levels, which is especially suitable for odd numbers of magnifications. The main difference between this example and the first example is that some additional pixels are located at the original pixel locations. The methods to generate the levels of the additional pixels can be similar to the methods as described in FIGS. 11B–D.

In another preferred embodiment, there is an additional step to improve the magnified image. Suppose that the actual boundary where the levels of the image change significantly is at a small distance away from the boundary found. Then the level of some additional pixels that are in close proximity to the found boundary may have values quite different from its immediate neighboring pixels. This may be due to the blurring effect of the detectors measuring the original image. Such abnormalities can be corrected by the methods 450 shown in FIG. 12A, in combination with a graphical representation shown in FIG. 12B. First a size of a window 475 is selected, 452. One example is a size that covers 2 by 2 original pixels. Then center, 454 the window at every additional pixel close to a found boundary. For example, center the window 475 at the additional pixel 477. With the window centered, one calculates, 456, the average level of the original pixels on the side of the boundary of the additional pixel within the window. For example, calculate the average level of the original pixels, 479, 481 and 483. If the average level differs by more than a pre-set value from the level of the additional pixel, replace, 458, the level of the additional pixel with the average value. In one embodiment, the pre-set value is one standard deviation of the levels of the original pixels. This process is performed on every pixel in close proximity to a boundary. If an additional pixel is bounded by two boundaries, then the original pixels averaged are only those within the window on the side of the additional pixel and within the two boundaries.

After the formation of all the additional pixels, the distances between the pixels are expanded, 112, so that the resolution of the locations of the pixels are the same as the original pixels. For example, all the crosses in the digital image in FIG. 11A has a resolution of 300 pixels per inch. After the formation of the additional pixels, the triangles have a resolution of 600 pixels per inch. The size of the image is then expanded by expanding the distances between the additional pixels so that the resolution of the locations of the additional pixels goes back to 300 pixels per inch. This means expanding the image two times in each dimension.

Figure 13:
FIG. 13 shows a magnified image generated using an edge map.

FIG. 13 shows the magnified digital image based on the above described method. With the edge map, the magnified image is more crisp than the image in FIG. 3, for example, as in the stamens of the off-white lily on the right hand side of the Figure or as in the gaps between flowers.

Figure 14:
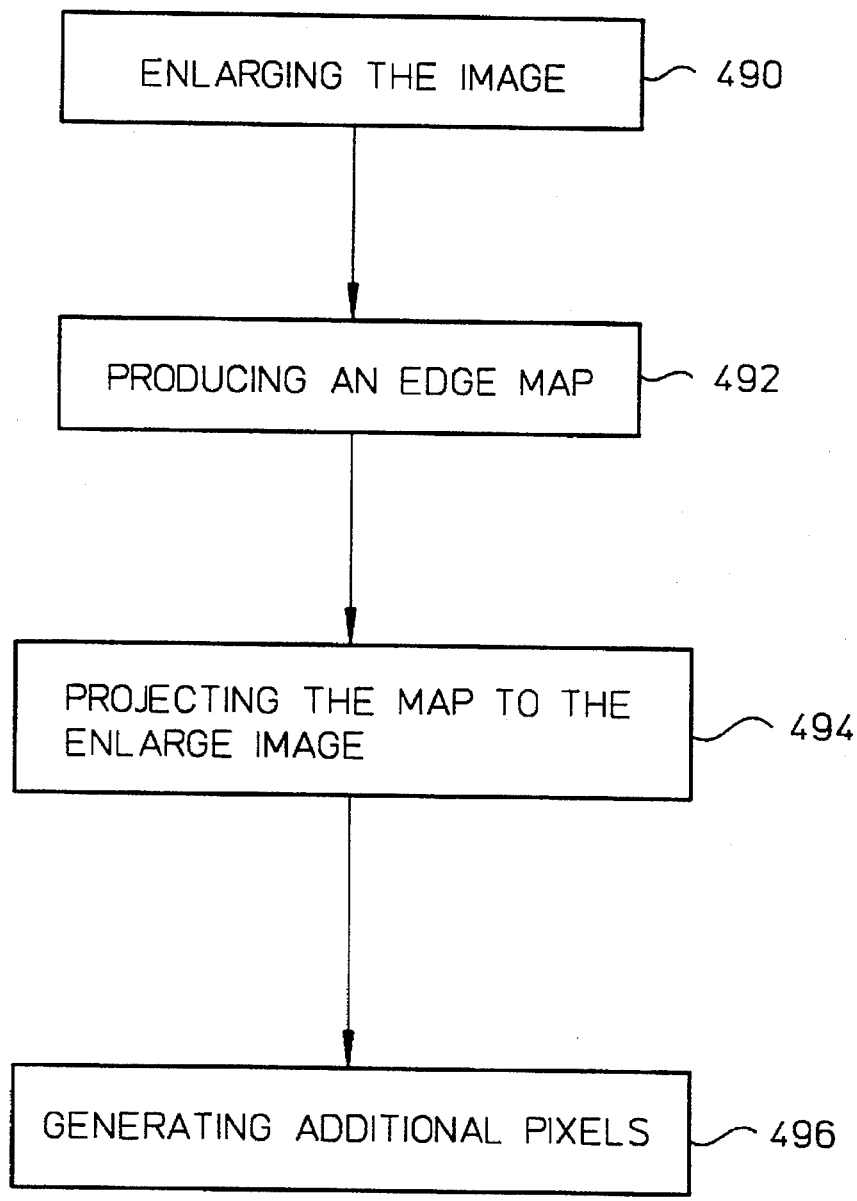
FIG. 14 shows another preferred method to magnify a digital image in the present invention.

In the above description, the distances between pixels are expanded at the end. FIG. 14 shows a modified e preferred embodiment 498, in which the distances between pixels are expanded in the beginning. First, the original digital image is enlarged, 490 by expanding proportionally the distances between the original pixels. Then an edge map is produced, 492, by one of the preferred methods described above. The produced edge map is projected, 494, onto the enlarged image to generate 496, additional pixels by methods as described above. After the step of generating, the resolution of the locations of the pixels becomes the same as the original pixels, and the digital image is magnified.

Figure 15:
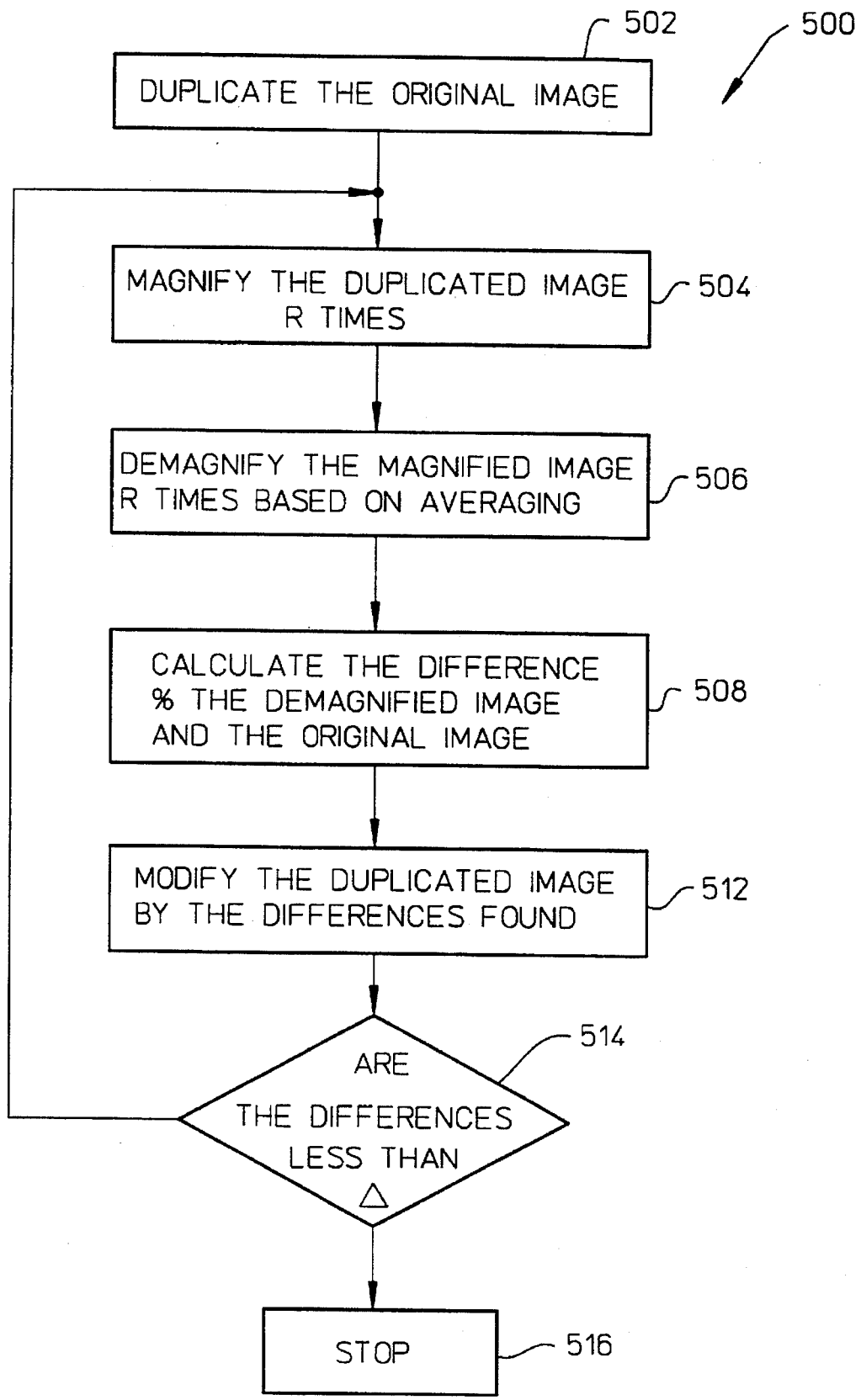
FIG. 15 shows the feedback method in the present invention.

In another preferred embodiment, the image in FIG. 13 is further improved by a feedback method, 500, shown in FIG. 15. In this feedback method, the original digital image is duplicated, 502, to form a duplicated image. The duplicated image is then magnified, 504, R times. This magnification process may be based on the edge map method as described above or may be based on other means. However, the magnification process is preferably not the pixel replication process, which generates the image shown in FIG. 2. The magnified image is then de-magnified, 506, R times.

Figure 16:
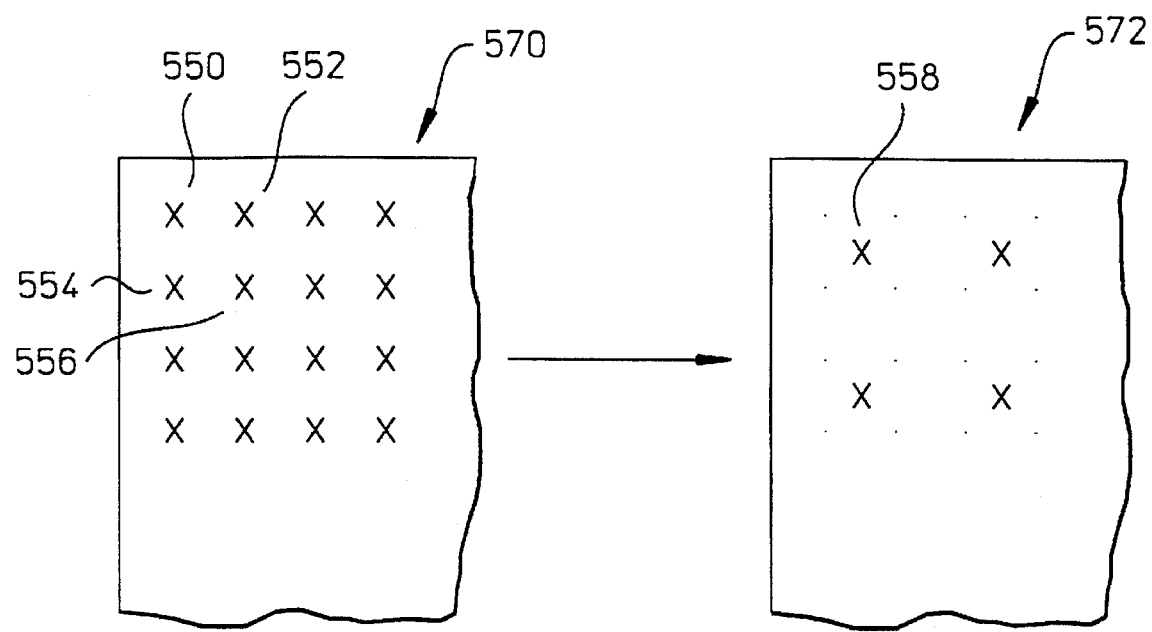
FIG. 16 shows a two-dimensional example of a prior art averaging process.

The demagnification process is based on averaging. Every fixed number of pixels are replaced with one pixel whose level is the average level of the fixed number of pixels. FIG. 16 shows a two-dimensional example of the averaging process for a two-times demagnification. Every four pixel is replaced by one pixel; for example, the pixels 550, 552, 554 and 556 in the magnified image 570 is replaced by the pixel 558 in the de-magnified image 572. The level of the pixel 558 is equal to the average of the levels of the four pixels in the magnified image 570. The location of the pixel 558 is in the center of the four pixels 550, 552, 554 and 556. The de-magnifying step is preferably hot the inverse of the magnifying step. In other words, the magnification step is preferably not a pixel-replication process.

Figure 17:
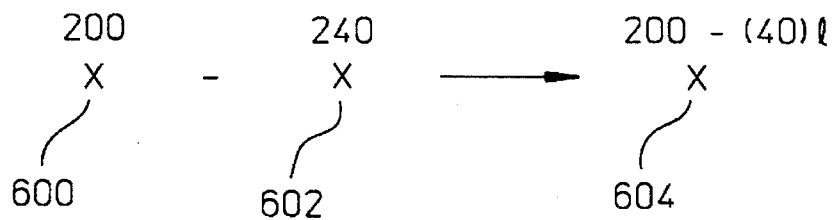
FIG. 17 shows an example of the step of modifying in the present invention.

Then, one calculates, 508, the difference between the de-magnified image and the original digital image at every pixel. This is a pixel-to-pixel comparison method. Based on the differences found, the duplicated image is modified, 512. This modifying step includes modifying every pixel of the duplicated image by a selected multiple of the difference found at that pixel from the step of calculation 508. FIG. 17 shows an example of the step of modifying. The original image has a pixel 600 with a grey-level of 200. That pixel is compared to the pixel, 602, at the corresponding position in the de-magnified image. The pixel 602 has a grey-level of 240. The difference value is 40. A multiple of the difference value is used to modify the corresponding pixel, 604, in the duplicated image. If the multiple is too large, one may get an "oscillation." If the multiple is too small, one may take a long time before one gets satisfactory results. The multiple value can be found experimentally. Note also that the three pixels, 600, 602 and 604, are all in substantially the same location for the pixel-to-pixel operation described.

After the modification of the duplicated image, one checks the differences found in the step of calculation, 508. If the average of the absolute of the differences found is bigger than a pre-selected value, one repeats, 514 from the step of magnifying, 504, the duplicated image R times. This pre-selected value depends on the accuracy one desires. One is not limited to using the absolute values of the differences. Other values may be used, such as the square of the differences. Anyway, if the differences found are less than the pre-selected value, the feedback process stops 516, and the magnified duplicated image becomes the final result of magnification.

Figure 18:
FIG. 18 shows a magnified image generated with the feedback method.

FIG. 18 shows an example of applying the feedback method on the image shown in FIG. 13 with the pre-selected value set as 2.5 and the multiple value set as 1. The multiple value preferably should be between 0 and 2. The magnified image formed after the feedback method has significantly better level consistency. Also, many details in the original image are maintained in the magnified image; for example, compare the veins on the petals of the flowers in FIG. 13 and FIG. 18.

This feedback process is applicable not just to two-dimensional images. It is equally applicable for magnifying images with other dimensions, such as one or three dimensional images. The difference is the fixed number of pixels to be averaged. For one-dimensional magnification of R times, the fixed number is R. For three dimensional magnification of R times, the fixed number is R*R*R. The above preferred embodiment describes the magnification factors being equal for all the dimensions. In other preferred embodiments, the magnification factors are different for different dimensions. In other words, for example the two dimensional magnification may be R*N, with R not equal to N.

The present invention is not just applicable to continuous tone images. It can also be applied to non-continuous tone images, such as halftone images. As an example, for halftone images, the images are first changed to continuous tones, based on inverse halftoning techniques. Then images are magnified as described above. After the magnification process, the images are halftoned to produce halftone images. Inverse halftoning and halftoning techniques are obvious to those with ordinary skill in the arts and will not be further described in the present disclosure.

From the foregoing it should be appreciated that an edge map significantly maintains the crisp-edge features of a magnified image, and the feedback method further improves the quality of the magnified image. The invention is applicable to many other areas than those just described. For example, the invention is applicable to three-dimensional images, such as a holographic image; in that case, the edge map would not be just lines, but surfaces. Another example is to apply the invention to color images. For monochrome images, the level of each pixel is the intensity at that pixel. For color images, the level of each pixel can be identified by the intensities of their primaries, such as red, green and blue; the present invention is applied to each color individually, and then the results of the three colors are combined at each pixel to re-generate the color images. Another preferred embodiment for color images is to identify the level of each pixel as its luminous at that pixel. Then the present invention is applied to the luminous value as described above.

This invention can be applied to one-dimensional images. In that case, the image is a one-dimensional waveform or a signal, like a voice signal. Another area of application is in video. In that case, one magnifies two-dimensional images, frame by frame, leaving the third dimension, which is time, alone.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A method of magnifying a digital image with a plurality of original pixels to form a magnified image, each pixel having a level, the locations of the pixels having a resolution, the method comprising the steps of:

producing an edge map with a plurality of boundaries by analyzing the digital image to pick locations in neighborhoods where levels change significantly and then connecting the picked locations to form edges;

projecting the edge map onto the digital image;

generating one or more additional pixels in locations among the original pixels by manipulating the levels of one or more original pixels that do not have among them any boundaries set by the edge map;

such that the total number of additional pixels is related to the number of original pixels and the magnification;

duplicating the digital image to form a duplicated image;

magnifying the duplicated image R times, based on the additional pixels, by a process other than the pixel replication process;

de-magnifying the magnified image R times by replacing every fixed number of pixels with one pixel whose level is the average of the levels of the fixed number of pixels, the size of the fixed number depending on R;

calculating the difference between the de-magnified image and the digital image at the position of every original pixel;

modifying the duplicated image according to the differences found from the step of calculating;

repeating from the step of magnifying the differences found in the step of calculating are bigger than a preselected value;

such that, if the differences found in the step of calculating are not bigger than the pre-selected value, the magnified duplicated image is the desired magnified image; and the quality and level consistency of the magnified image is improved.

2. A method as recited in claim 1 wherein:

the digital image is magnified and de-magnified in one dimension; and the fixed number is R.

3. A method as recited in claim 1 wherein:

the digital image is magnified and de-magnified in two dimensions; and the fixed number is R * R.

4. A method as recited in claim 1 wherein:

the digital image is magnified and de-magnified in three dimensions; and the fixed number is R * R * R.

5. A method as recited in claim 1 wherein the step of modifying includes modifying every pixel of the duplicated image by a selected factor of the difference found at that pixel from the step of calculating.

6. A method as recited in claim 2 wherein the step of modifying includes modifying every pixel of the duplicated image by a selected factor of the difference found at that pixel from the step of calculating.

7. A method as recited in claim 3 wherein the step of modifying includes modifying every pixel of the duplicated image by a selected factor of the difference found at that pixel from the step of calculating.

8. A method recited in claim 1 wherein the image is in monochrome.

9. A method as recited in claim 1 wherein the image is in color.

10. A method as recited in claim 1 wherein the image is a continuous tone image.

11. A method as recited in claim 1 wherein the image is a halftone image, and the method further comprising the steps of, inverse halftoning the halftone image to form a continuous image before performing the method as recited in claim 19; and halftoning the resultant image to form a halftone image after performing the method as recited in claim 1.

* * * * *